United States Patent
Spiser-Albert et al.

(10) Patent No.: US 6,711,544 B2
(45) Date of Patent: Mar. 23, 2004

(54) SPEECH THERAPY SYSTEM AND METHOD

(75) Inventors: Valarie Spiser-Albert, San Antonio, TX (US); Carol Waryas, San Antonio, TX (US); Pam Parmer, San Antonio, TX (US)

(73) Assignee: Harcourt Assessment, Inc., San Antonio, TX (US)

(*) Notice: Subject to any disclaimer, the term of this patent is extended or adjusted under 35 U.S.C. 154(b) by 126 days.

(21) Appl. No.: 09/770,093

(22) Filed: Jan. 25, 2001

(65) Prior Publication Data

US 2002/0099554 A1 Jul. 25, 2002

(51) Int. Cl.[7] .......................... G10L 21/06; G09B 19/04
(52) U.S. Cl. ........................ 704/271; 434/185
(58) Field of Search .............................. 704/276, 270, 704/258, 251, 246; 434/327, 322, 185, 157, 116

(56) References Cited

U.S. PATENT DOCUMENTS

| | | | |
|---|---|---|---|
| 4,969,194 A | | 11/1990 | Ezawa et al. |
| 5,303,327 A | * | 4/1994 | Sturner et al. ............ 704/270 |
| 5,393,236 A | | 2/1995 | Blackmer et al. |
| 5,487,671 A | | 1/1996 | Shpiro et al. |
| 5,562,453 A | | 10/1996 | Wen |
| 6,009,397 A | | 12/1999 | Siegel |
| 6,019,607 A | * | 2/2000 | Jenkins et al. ............ 434/116 |
| 6,030,226 A | * | 2/2000 | Hersh ..................... 434/236 |
| 6,077,085 A | | 6/2000 | Parry et al. |

FOREIGN PATENT DOCUMENTS

| | | |
|---|---|---|
| EP | 0 360 909 | 4/1990 |
| EP | 0 504 927 | 9/1992 |
| EP | 1 089 246 | 4/2001 |
| WO | 99/13446 | 3/1999 |

OTHER PUBLICATIONS

Bernthal, John, et al. "Articulation and Phonlogical Disorders," 1998, Allyan & Bacon, 4th Edition, pp. 233–236, 292.*

Jackson, Peter, "Introduction to Expert Systems," 1999, Addison Wesley Longman Limited, 3rd Edition, pp. 207–210.*

LocuTour Multimedia, Articulation: Therapy for Oral Apraxia, Dysarthria, and Developmental Speech Disorders, http://www.learningfundamentals.com/products/manuals/Artic_I_Cons_Phonemes.pdf.*

(List continued on next page.)

Primary Examiner—Richemond Dorvil
Assistant Examiner—V Paul Harper
(74) Attorney, Agent, or Firm—Allen, Dyer, Doppelt, Milbrath & Gilchrist, P.A.

(57) ABSTRACT

A method for providing speech therapy includes the steps of selecting a problem speech sound and searching a database that houses a plurality of records. Each record contains a picture and a word associated with the word. Next a set of records is automatically generated from the plurality of records. Each record contains a word specific to the problem speech's sound. At least a portion of each record in the set of records is next automatically presented to a user sequentially on a display device, and the user is prompted to pronounce the displayed word. Finally, the pronunciation of each word is scored. The system includes hardware for carrying out the method, including a processor, display device, input device, and software resident on the processor adapted to access a database of records, present records to the user, and receive a score entered into the input device.

34 Claims, 3 Drawing Sheets

OTHER PUBLICATIONS

Parrot Software User's Manual "Automatic Articulation Analysis 2000," Parrot Software, Inc.*

American Speech–Language–Hearing Association, Technology 2000: Clinical Applications for Speech–Language Pathology, http://professional.asha.org/tech_resources/tech2000/7.htm, pp. 1–7, 1996.

PictureGallery, http://www.psychcorp.com/catalogs/sla/sla014atpc.htm, pp. 1–2.

The Childes System, Child Language Data Exchange System, http://childes.psy.cmu.edu.

Additional Childes Tools, CHILDES Windows Tools, http://childes.psy.cmu.edu/html/wintools.html.

SAILS, the Speech Assessment & Interactive Learning System (SAILS™) Using SAILS in Clinical Assessment and Treatment, http://www.propeller.net/react/sails2.htm, pp. 1–3.

GFTA–2: Goldman–Fristoe Test of Articulation–2, http://www.agsnet.com/templates/productview_p.asp?GroupID=a11750, pp. 1–3.

KLPA: Khan–Lewis Phonological Analysis, http://www.agsnet.com/templates/productview_p.asp?GroupID=a1820, pp. 1–2.

* cited by examiner

SPEECH THERAPY SYSTEM AND METHOD

BACKGROUND OF THE INVENTION

1. Field of the Invention

The present invention relates to systems and methods for analyzing and remediating speech pathologies, and, more particularly, to such systems and methods that are computer-based.

2. Description of Related Art

Articulation and phonology disorders are the most common of the speech and language disorders. The prevalence of this disorder is, at the time of writing, approximately 10% of the school-age population. In addressing a perceived articulation issue in a student, speech/language pathologists have in the past used an initial test based upon a series of cards. Each card contains a picture and a word, and the student is asked to pronounce the word associated with the card. The pathologist then determines whether the student's pronunciation is "right" or "wrong." It may be recognized that such a system can be cumbersome, owing to the cards' having to be placed in a desired order and sorted manually.

An intervention system designed to automate this process, Picture Gallery I, was presented by the owner of the current application. In this system pictures and/or words stored in a database could be sorted using a desired criterion such as a particular phoneme and presented to the student under software control for facilitating the acquisition or remediation of speech or language skills. No analysis or scoring is performed; rather, the product is intended for use by one or more students, either alone or in concert with a pathologist/teacher.

A previously known method of diagnosing articulation or phonology disorders included a "pencil and paper" test wherein a student is asked to speak a word. The therapist grades the word subjectively, based upon the therapist's ear and the local standards.

Other systems known in the art that address speech/language analysis and therapy methodologies includes those of Neuhaus (U.S. Pat. No. 6,113,393), Parry et al. (U.S. Pat. No. 6,077,085), UCSF and Rutgers (U.S. Pat. Nos. 5,813,862 and 6,071,123), Neumeyer et al. (U.S. Pat. No. 6,055,498), Jenkins et al. (U.S. Pat. Nos. 5,927,988 and 6,019,607), Siegel (U.S. Pat. No. 6,009,397), Beard et al. (U.S. Pat. No. 5,857,173), Aaron et al. (U.S. Pat. No. 5,832,441), Russell et al. (U.S. Pat. Nos. 5,679,001 and 5,791,904), Rothenberg (U.S. Pat. No. 5,717,828), Wen (U.S. Pat. No. 5,562,453), and Ezawa et al. (U.S. Pat. No. 4,969,194). Commercial software products in the field of articulation, phonology, or speech sound production include SpeechViewer, Interactive System for Phonological Analysis, Speech Master, Visi-pitch, and Computerized Profiling. Commercial print products include the Goldman-Fristoe Test of Articulation (American Guidance Service), Khan-Lewis Test of Phonology (American Guidance Service), Photo Articulation Test (ProEd), and Fisher-Logeman Test of Articulation (Pro-Ed).

SUMMARY OF THE INVENTION

It is therefore an object of the present invention to provide a system and method for eliciting a desired sound from a user.

It is a further object to provide such a system and method adapted to generate a report.

It is another object to provide a system and method for testing a user's articulation.

These and other objects are achieved by the present invention, which comprises a method and system for providing speech therapy. The method comprises the steps of selecting a problem speech sound and searching a database that comprises a plurality of records. Each record comprises a picture and a word associated with the word.

Next a set of records is automatically generated from the plurality of records. Each record contains a word specific to the problem speech's sound. The set of records is next automatically presented to a user sequentially on a display device, and the user is prompted to pronounce the displayed word. Finally, the pronunciation of each word is scored.

The system of the present invention comprises a processor, an input device in communication with the processor having means for selecting a problem speech sound, and a display device in communication with the processor. The database as described above is resident on the processor, as are software means. The software is adapted to automatically generate a set of records from the plurality of records, with each record containing a word specific to the problem speech sound. The software is also adapted to automatically present at least a portion of each record in the set of records to a user sequentially on a display device; the set of records to a user sequentially on the display device and to prompt the user to pronounce the displayed word. Finally, the software is adapted to receive via the input device a score for the pronunciation of each word.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1A:
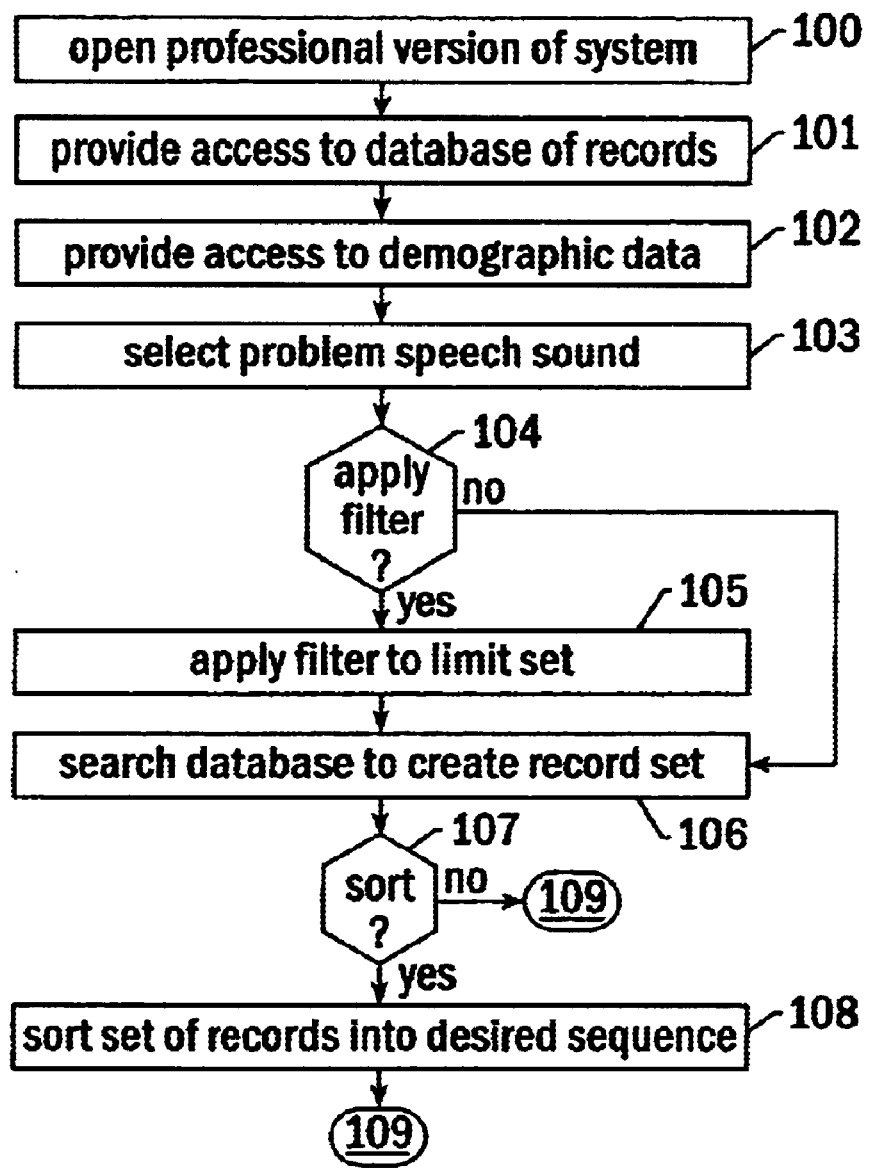
FIGS. 1A,1B is a flow chart for an exemplary embodiment of the speech therapy method of the invention.
Figure 1B:
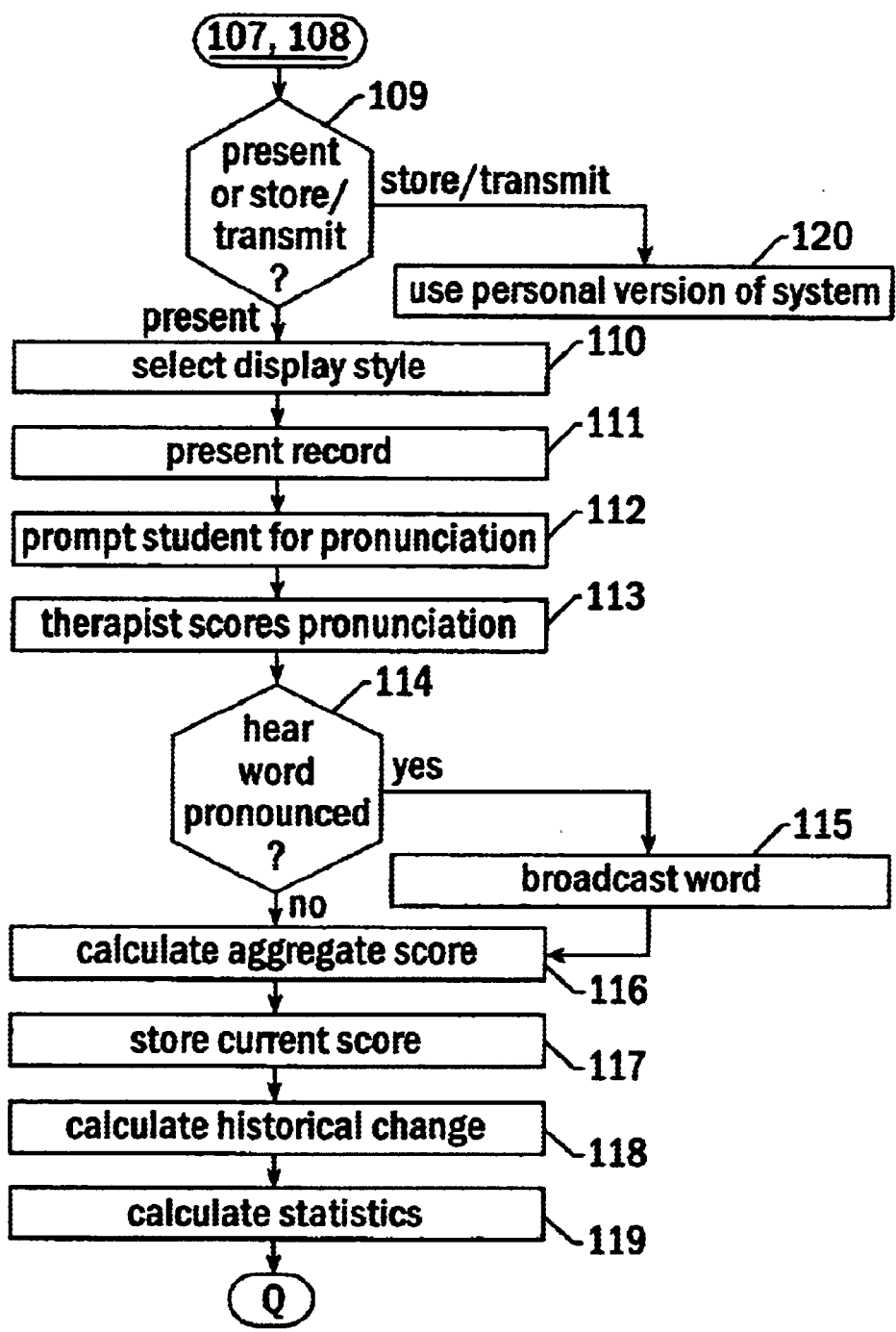
Figure 2:
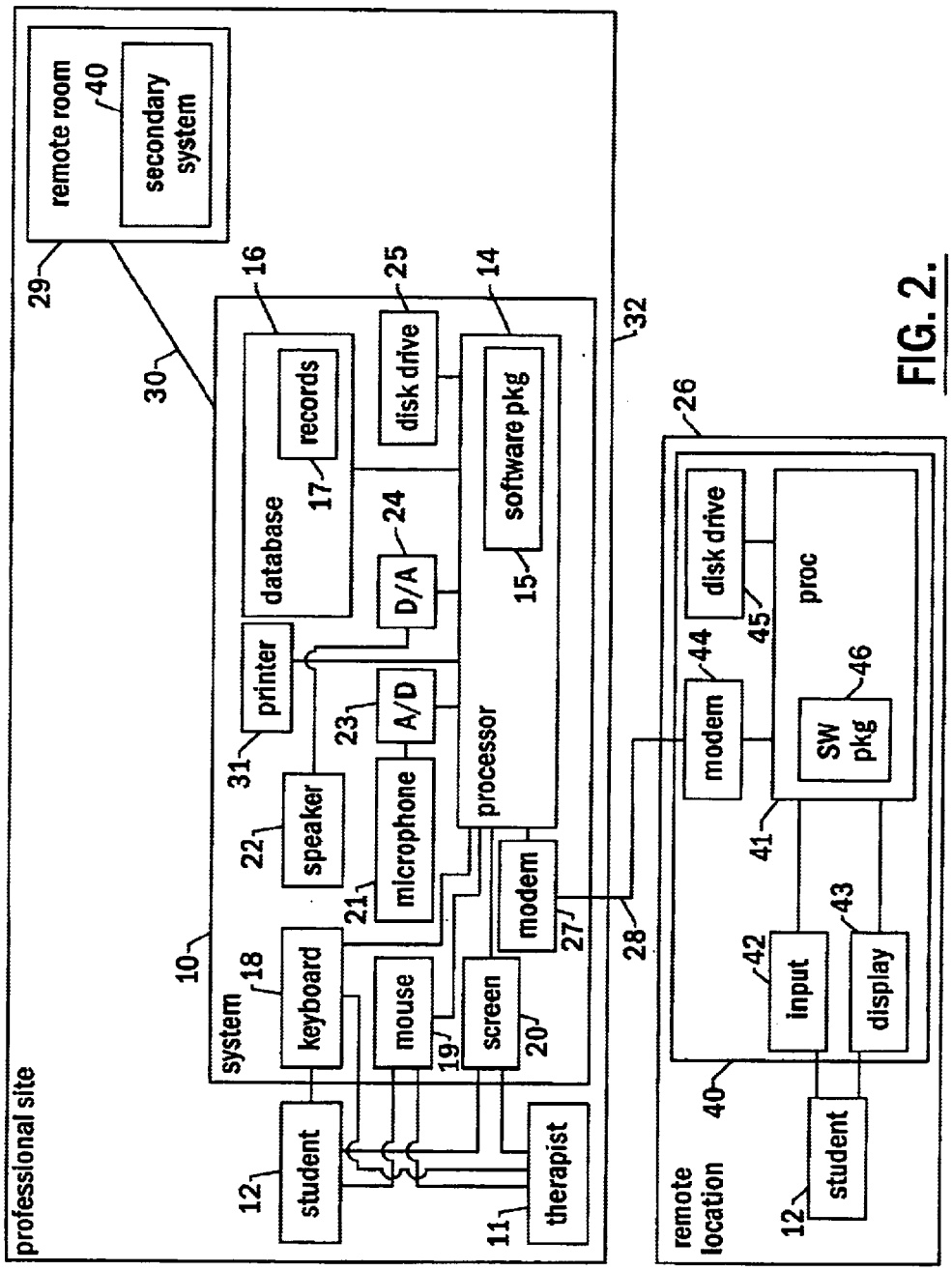
FIG. 2 is a schematic diagram of the speech therapy system.

A description of the preferred embodiments of the present invention will now be presented with reference to FIGS. 1A–2.

A flow chart of an exemplary embodiment of the automated speech therapy/intervention method is given in FIGS. 1A,1B, and a schematic of the system in FIG. 2. The system and method are also contemplated for use in the acquisition of a language skill as well as in a remediation setting. There are two versions of the system and method: In the "professional" version 10 of the invention (block 100), typically two people who will be referred to as "therapist" 11 and "student" 12 are present, although this is not intended as a limitation. This version is contemplated for use in such settings 32 as a hospital, clinic, rehabilitation center, school, or private facility. In the "personal" version 40 of the invention, the "student" 12 may be working alone, or in the presence of a nonprofessional such as a parent. The therapist 11 may be, for example, a speech therapist or a teacher; the student 12 may be a user who is learning a second language or a school attendee who is being tested for, or who is already known to have, an articulation problem or phonological disorder.

The method comprises the steps of providing access to an electronic database that includes a plurality of records (block 101). Each record comprises a word, a picture representative of the word, and a recommended pronunciation of the word. In an alternate embodiment, the record may also include a digitized video clip to represent motion or a verb to impart a concept of action. In another embodiment the record may further include a digitized sound that is associated with the word. For example, the record for the word dog might contain a picture of a dog, a video clip of a dog running, and/or a barking sound. It is believed that such multiple stimuli appeal to a multiplicity of cognitive areas, thereby optimizing the student's improvement.

Each record may further contain data useful for performing sorting functions, such as at least one category and/or concept. An exemplary set of categories comprises: animals, art, babies, celebrations, global images, environment, family, food, garden, health and exercise, home, leisure, medical, money, music, pets, play, school, shopping, signs/symbols, sports, technical, vacations, and work. An exemplary set of concepts comprises: activities, objects, places, people, ideas, and events. The record also typically comprises a vocabulary level associated with the word and a length of the word.

The method next comprises the step of inputting or accessing previously input demographic information for the student (block 102). Then a problem speech sound that is desired to be improved upon is selected that is known from a prior diagnosis (block 103). The problem speech sound may be selected from a group consisting of a phoneme and a "feature." The feature comprises at least one of a place, a manner, and a voicing characteristic. Searching on a feature yields matches in all positions of words. The database is electronically searched (block 106) for records containing words that include the problem speech sound to generate a set of records. A filter may be applied if desired (block 104) to further limit the set (block 105), including selecting a category or concept, using the demographic information to limit the set, such as eliminating words that are intended for students over 7 years of age for a 5-year-old student, setting a desired vocabulary level, or selecting a word length.

If desired (block 107), the set of records may also be sorted (block 108) in various ways to produce a desired sequence, including, but not limited to, putting the words in alphabetical order, random order, or some other chosen sequence. In a preferred embodiment, all the words in the database contain at least one of the letters "r," "l," and "s," since these are known to present a problem most frequently.

For a professional therapy session, a decision may be made whether to present the set of records or store/transmit them (block 109). If the former, the set of records is next presented sequentially to the student in the predetermined sequence on a display device (block 111), and the student is prompted to pronounce the word (block 112). The display style may be selected (block 110) from a word only, a picture only, or a word plus a picture.

If the student can read, he or she can use the displayed word to form a pronunciation; if the student cannot yet read, or cannot read the currently presented language, the picture will also aid in acquisition of reading skills as well as pronunciation.

In the professional setting, the therapist scores the student's pronunciation (block 113) by inputting, for example, "correct," "incorrect," "skip," or "re-present," which will record an indication to re-present the record at a later time, such as after all the other items in the set have been presented. The student or therapist can also elect (block 114) to hear the word pronounced (block 115) in a recommended manner by making an appropriate selection on an input device.

The scores are received by the system, and an aggregate score is calculated (block 116) for the problem speech sound. The database also comprises a historical record of all sessions for each of the students, and the database is then accessed to store the current score thereinto (block 117). The therapist may choose to calculate a historical change (block 118) from previously saved scores to provide an indication of the student's progress. Such scores may also be used to calculate statistics (block 119) for a group of students, using, for example, a demographic filter.

The "personal version" of the system and method does not accept scoring, nor is there a database from which sets of records may be created. Rather, the professional version is adapted to download a selected set of records onto a storage medium, such as a diskette, or to transmit the set of records to a remote site (block 109). Such a remote site may comprise, but is not intended to be limited to, a room remote from the main processor accessible via intranet, or a different building accessible via internet. This version then enables the student to perform (block 120) the steps in blocks 110–112 and 115 as desired on his or her own.

The system 10, as schematically illustrated in FIG. 2, comprises a processor 14, on which are resident the software package 15 of the present invention adapted to perform the functions as outlined above and a database 16 comprising the plurality of records 17 and demographic and historical data on the users 12. An input device is in communication with the processor 14 that has means for selecting a problem speech sound. Such means may comprise any of the devices known in the art such as a keyboard 18 or pointing device such as a mouse 19 or touch screen. A display device such as a display screen 20 is also in communication with the processor 14.

Optional elements that are also in communication with the processor 14 may include a microphone 21 and a speaker 22, both under processor 14 control, as well as means for performing analog-to-digital 23 and digital-to-analog 24 conversions. The system 10 also has means for transferring records from the database to a storage medium such as a disk drive 25, under control of the software 15, or to a remote site such as another location 26 via a modem 27 over the internet 28 or such as another room 29 at the same location via an intranet 30. A printer 31 under processor control may also be provided for furnishing a hard copy of any portion of the session as desired.

A secondary system 40 for use of the personal version of the invention at the remote location 26,29 comprises a processor 41, input device 42 and display device 43 in communication with the processor 41, and either or both of a modem 44 for receiving a set of records and a storage device reader 45 for reading a stored set of records. The software package 46 for this version is adapted to read the records, present them to the student 12 sequentially, and prompt the student 12 to pronounce the word associated with the record.

It may be appreciated by one skilled in the art that additional embodiments may be contemplated.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for providing speech therapy comprising the steps of:

selecting a problem speech sound;

searching a database comprising a plurality of records, each record comprising a picture and a word associated therewith;

automatically generating a set of records from the plurality of records, each record containing a word specific to the problem speech sound;

automatically presenting a symbolic, nonverbal portion of each record in the set of records to a user sequentially on a display device, the symbolic, nonverbal portion selected from a group consisting of at least one of a printed word, a sound, and a picture;

prompting the user to pronounce a word associated with the presented record portion; and scoring the pronunciation of an entirety of each word.

2. The method recited in claim 1, wherein the picture comprises a moving picture for imparting a concept of action.

3. The method recited in claim 1, wherein the record further comprises a nonverbal sound associated with the word and the presenting step further comprises broadcasting the sound to the user along with the picture and the word.

4. The method recited in claim 1, wherein the record further comprises data on the word, including a word length and a vocabulary level, and the generating step comprises selecting records containing at least one of a desired word length and a desired vocabulary level.

5. The method recited in claim 1, further comprising the step, prior to the selecting step, of diagnosing an articulation problem of the user to determine a problem speech sound.

6. The method recited in claim 1, further comprising the step, following the record presenting step, of permitting the user to hear the word associated with the presented record pronounced in a recommended manner.

7. The method recited in claim 1, wherein each record further comprises at least one category to which the record belongs, and further comprising, prior to the generating step, the step of permitting the user to select a category, and wherein the generating step comprises generating a set of records, each record a member of the selected category.

8. The method recited in claim 1, wherein each record further comprises at least one concept to which the record belongs, and further comprising, prior to the generating step, the step of permitting the user to select a concept, and wherein the generating step comprises generating a set of records, each record a member of the selected concept.

9. The method recited in claim 1, further comprising the steps of:

saving the generated set of records on a storage medium; and automatically presenting the symbolic, nonverbal portion of the set of records to a user sequentially on a second display device; and prompting a user situated adjacent the second display device to pronounce the word displayed on the second display device.

10. The method recited in claim 1, further comprising the steps of:

transmitting the generated set of records electronically to a remote display device; and prompting a user situated adjacent the remote display device to pronounce the word displayed on the remote display device.

11. The method recited in claim 1, wherein the presenting step comprises presenting the set of records in a predetermined sequence.

12. The method recited in claim 11, wherein the predetermined sequence is selected from a group consisting of alphabetical order, random order, and a chosen sequence.

13. The method recited in claim 1, wherein each word in the records comprises at least one of the letters "r," "l," and "s."

14. The method recited in claim 1, further comprising the steps of:

receiving each score; and calculating a final aggregate score for the problem speech sound.

15. The method recited in claim 14, wherein the database further comprises a previously saved score for the user, and further comprising the steps of:

saving the aggregate score in the database; and calculating a historical change from the previously saved score to the aggregate score.

16. The method recited in claim 15, wherein the saving step further comprises storing demographic information on the user.

17. The method recited in claim 16, wherein the automatically generating step comprises limiting the set of records based upon a selected demographic filter.

18. The method recited in claim 1, wherein the problem speech sound is selected from a group consisting of a phoneme and a feature, the feature comprising at least one of a place, a manner, and a voicing characteristic.

19. The method recited in claim 1, further comprising the step, prior to the presenting step, of selecting a portion of each record to be presented, the portion selected from a group consisting of a word, a picture, and a word and a picture.

20. A system for providing speech therapy comprising:

a processor;

an input device in communication with the processor having means for selecting a problem speech sound;

a display device in communication with the processor;

a database resident on the processor comprising a plurality of records, each record comprising a picture and a word associated therewith; and software means resident on the processor adapted to:

automatically generate a set of records from the plurality of records, each record containing a word specific to the problem speech sound;

automatically present a symbolic, nonverbal portion of each record in the set of records to a user sequentially on the display device, the symbolic, nonverbal portion selected from a group consisting of at least one of a printed word, a sound, and a picture;

prompt the user to pronounce the displayed word; and receive via the input device a score for the pronunciation of each word in its entirety.

21. The system recited in claim 20, wherein the picture comprises a moving picture for imparting a concept of action.

22. The system recited in claim 20, further comprising an audio speaker in communication with the processor, and wherein:

the record further comprises digitized data representative of a nonverbal sound associated with the word; and the software means is further adapted to direct the speaker to broadcast the sound to the user along with the picture and the word.

23. The system recited in claim 20, further comprising a microphone in communication with the processor, and wherein the software means is further adapted to receive input from the microphone and diagnose an articulation problem of the user based upon a pronounced word to determine a problem speech sound.

24. The system recited in claim 20, wherein:

the record further comprises digitized data representative of a recommended pronunciation of the word associated with the presented record; and the software means is further adapted to broadcast via the speaker the recommended pronunciation of the word to the user following the receipt of a score.

25. The system recited in claim 20, wherein:

each record further comprises at least one category to which the record belongs; and the software means is further adapted to permit the user to select a category via the input device and to generate a set of records wherein each record is a member of the selected category.

26. The system recited in claim 20, wherein:

each record further comprises at least one concept to which the record belongs; and the software means is further adapted to permit the user to select via the input device a concept and to generate a set of records wherein each record is a member of the selected concept.

27. The system recited in claim 20, further comprising a storage medium removably affixable in communication with the processor, and wherein the software means is further adapted to store the set of records on the storage medium for subsequent presentation to the user on a second display device.

28. The system recited in claim 20, wherein the software means is further adapted to present the set of records in a predetermined sequence.

29. The system recited in claim 28, wherein the predetermined sequence is selected from a group consisting of alphabetical order, random order, and a chosen sequence.

30. The system recited in claim 20, wherein each word in the records comprises at least one of the letters "r," "l," and "s."

31. The system recited in claim 20, wherein the software means is further adapted to:

receive each score via the input device; and calculate a final aggregate score for the problem speech sound.

32. The system recited in claim 31, wherein:

the database further comprises a previously saved score for the user; and the software means is further adapted to save the aggregate score in the database, calculate a historical change from the previously saved score to the aggregate score, and display the historical change on the display device.

33. The system recited in claim 32, wherein the software means is further adapted to store demographic information on the user entered via the input device.

34. The system recited in claim 33, wherein the software means is further adapted to limit the generated set of records prior to automatically presenting the set of records to the user based upon a selected demographic filter.

* * * * *